United States Patent
Le Boulicaut et al.

(10) Patent No.: US 11,719,192 B2
(45) Date of Patent: Aug. 8, 2023

(54) ACOUSTIC ATTENUATION PANEL FOR AN AIRCRAFT JET ENGINE NACELLE

(71) Applicant: Safran Nacelles, Gonfreville l'Orcher (FR)

(72) Inventors: Loïc Hervé André Le Boulicaut, Gonfreville l'Orcher (FR); Christophe Thorel, Gonfreville l'Orcher (FR); Simon Verger, Gonfreville l'Orcher (FR); Mathieu Preau, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 469 days.

(21) Appl. No.: 17/103,424

(22) Filed: Nov. 24, 2020

(65) Prior Publication Data
US 2021/0102513 A1    Apr. 8, 2021

Related U.S. Application Data

(63) Continuation of application No. PCT/FR2019/051205, filed on May 24, 2019.

(30) Foreign Application Priority Data

May 24, 2018 (FR) ..................... 18/54404

(51) Int. Cl.
*F02K 1/82* (2006.01)
*B64C 7/02* (2006.01)
(Continued)

(52) U.S. Cl.
CPC ........... *F02K 1/827* (2013.01); *B64C 7/02* (2013.01); *B64D 33/06* (2013.01); *F02C 7/24* (2013.01); *F05D 2260/963* (2013.01)

(58) Field of Classification Search
CPC .. F02K 1/827; F02C 7/045; F02C 7/24; F01D 25/30; B64D 33/06; B64D 2033/0206;
(Continued)

(56) References Cited

U.S. PATENT DOCUMENTS 4,001,473 A    1/1977 Cook
4,969,535 A    11/1990 Arcas et al.
(Continued)

FOREIGN PATENT DOCUMENTS

EP    2604426    6/2013
RU    2526215    8/2014
(Continued)

OTHER PUBLICATIONS

Search Report appended to Decision to Grant in RU Application No. 2020137676, completed Nov. 2, 2022, 2 pages.
(Continued)

*Primary Examiner* — Todd E Manahan
*Assistant Examiner* — Rodolphe Andre Chabreyrie
(74) *Attorney, Agent, or Firm* — Burris Law, PLLC

(57) ABSTRACT

The present disclosure concerns an acoustic attenuation panel for an aircraft turbojet engine nacelle and a method for manufacturing this panel. The acoustic attenuation panel includes an alveolar central core interposed between an acoustic front skin comprising perforations and a rear skin, the acoustic attenuation panel including a front structure and a rear structure. The front structure includes the acoustic front skin and a first network of alveolar walls, the rear structure including the rear skin and a second network of alveolar walls, the first and second networks of alveolar walls being complementary so as to form, in an assembled position, the alveolar central core, the front structure and the rear structure being positioned opposite to each other and so that the network of alveolar walls of a structure is spaced (Continued)

from the skin of the other structure facing it by a clearance d.

11 Claims, 6 Drawing Sheets

(51) Int. Cl.
*F02K 1/34* (2006.01)
*F02C 7/24* (2006.01)

(58) Field of Classification Search
CPC .......... F23R 2900/0014; F23M 20/005; G10K 11/02; G10K 11/04; G10K 11/16; G10K 11/172
See application file for complete search history.

(56) References Cited

U.S. PATENT DOCUMENTS

| | | | |
|---|---|---|---|
| 11,066,147 B2* | 7/2021 | Kruckenberg | ............ B32B 3/12 |
| 2013/0146393 A1 | 6/2013 | Porte et al. | |
| 2021/0323295 A1* | 10/2021 | Clerambourg | .......... B32B 5/022 |

FOREIGN PATENT DOCUMENTS

| | | |
|---|---|---|
| RU | 2646061 | 3/2018 |
| RU | 2688063 | 5/2019 |
| WO | 1998006564 | 2/1998 |

OTHER PUBLICATIONS

International Search Report for International Application PCT/FR2019/051205, dated Sep. 6, 2019.

\* cited by examiner

ACOUSTIC ATTENUATION PANEL FOR AN AIRCRAFT JET ENGINE NACELLE

CROSS-REFERENCE TO RELATED APPLICATIONS

This application is a continuation of International Application No. PCT/FR2019/051205, filed on May 24, 2019, which claims priority to and the benefit of FR 18/54404 filed on May 24, 2018. The disclosure of the above application is incorporated herein by reference.

FIELD

The present disclosure relates to an acoustic attenuation panel for an aircraft turbojet engine nacelle and more particularly to a thrust reverser flap formed from such a panel, and to a method for manufacturing the acoustic attenuation panel.

BACKGROUND

The statements in this section merely provide background information related to the present disclosure and may not constitute prior art.

A turbojet engine nacelle generally has a substantially tubular structure comprising an air inlet upstream of the turbojet engine, a middle section intended to surround a fan of the turbojet engine, a downstream section intended to surround the combustion chamber of the turbojet engine and incorporating thrust reversal means. The nacelle is generally terminated by an ejection nozzle whose outlet is located downstream of the turbojet engine.

The modern nacelles are intended to accommodate a bypass turbojet engine capable of generating, via the blades of the rotating fan, a flow of hot air (primary flow) and a flow of cold air (secondary flow) which circulates outside the turbojet engine through an annular passage, also called a flow path, formed between a fairing of the turbojet engine and an inner wall of the nacelle.

The two air flows are ejected from the turbojet engine through the rear of the nacelle. The role of a thrust reverser is, during the landing of an aircraft, to improve the braking capability thereof by redirecting forwards at least one portion of the air ejected from the turbojet engine.

In this phase, the thrust reverser obstructs the at least one portion of the flow path of the cold flow and directs this flow forwardly of the nacelle, thereby generating a counter-thrust which is added to the braking of the wheels and airbrakes of the aircraft.

In general, the structure of a thrust reverser comprises a flap or a thrust reverser cowl displaceable between, on the one hand, a reverse jet position in which it opens in the nacelle a passage intended for the diverted air flow, and on the other hand, a direct jet position in which it closes this passage.

In the case of a thrust reverser with cascade vanes, also called thrust reverser cascades, the reorientation of the air flow is performed by cascade vanes, associated with thrust reverser flaps which at least partially block the air circulation flow path, the flap having only a simple sliding function aiming at uncovering or covering these thrust reverser cascades.

The flaps comprise a main panel-shaped structure, called an acoustic attenuation panel, carrying out this closure.

The acoustic attenuation panels usually have a laminated structure and comprise a central layer with a cellular structure, forming a cellular core.

The cellular core consists of honeycomb and is positioned between two skins covering opposite faces of this central layer. The skins are normally made of carbon fabric impregnated with epoxy resin cured by baking.

One of the skins, called an acoustic skin, is located on the side of the flow path. It is generally provided with a multitude of perforations (micro-perforations) which communicate the flow path with the alveoli of the central layer and absorb some of the noise produced by the turbojet engine during normal service.

These micro-perforations are conventionally made through the skin by drilling after the assembly of the skins to the central layer.

The known manufacturing methods are quite slow and expensive, involving many successive operations.

Another drawback is that the perforation of the skin on the side of the flow path is limited in practice to about 50% of the area of the panel (because it is not possible to make the perforations at the edges of the cores of the alveoli and near the fasteners of the yokes) for reasons of mechanical strength, which therefore reduces the absorption of noise.

Furthermore, other assembly methods exist but are expensive and/or difficult to implement. This is the case with the gluing between the different elements as described in U.S. Pat. No. 4,001,473.

According to a method of the prior art described in U.S. Pat. No. 4,001,473, two structures each comprising a network of alveolar walls and a skin are entangled and then glued together to form an acoustic attenuation panel comprising a honeycomb core sandwiched between an acoustic skin and a full skin.

A drawback of this manufacturing process is its complexity and its difficulty of implementation because the gluing or the welding of a skin with walls of alveoli is very difficult to carry out, resulting in additional costs.

In addition, the rigidity of the acoustic attenuation panel is not optimized, same for the acoustic performance.

And in case of damage to the acoustic skin caused by impacts, it is not possible to change the damaged portion very easily because the two respective networks of alveolar walls are glued together.

SUMMARY

This section provides a general summary of the disclosure and is not a comprehensive disclosure of its full scope or all of its features.

The present disclosure includes an acoustic attenuation panel for an aircraft turbojet engine nacelle which is simpler to implement and repair, more rigid and in which the useful acoustic surface is improved.

The present disclosure concerns an acoustic attenuation panel for an aircraft turbojet engine nacelle, including an alveolar central core interposed between an acoustic front skin comprising perforations and a rear skin, the acoustic attenuation panel including a front structure and a rear structure.

According to the present disclosure, the front structure includes the acoustic front skin and a first network of alveolar walls. The rear structure includes the rear skin and a second network of alveolar walls. The first and second networks of alveolar walls are complementary so as to form, in an assembled position, the alveolar central core. The front structure and the rear structure being positioned opposite to each other and so that the network of alveolar walls of a structure is spaced from the skin of the other structure facing it (or opposite) by a gap d.

In one form, the gap d is less than 2 mm and in another form less than 1.5 mm.

The gap d is a clearance which is advantageously less than 2 mm and in one form less than 1.5 mm, while being greater than zero.

The first and second networks of alveolar walls are crossing each other. Thus, the front and rear structures are crossing each other.

The two structures include respective peripheral borders which are fastened to each other.

Thus, the front and rear structures each comprising a peripheral border, said borders being fastened to each other for the assembly of the front and rear structures.

Each network of alveolar walls of a structure is formed of walls protruding on a respective inner surface of the skin of this structure.

According to one possible variation, notches are provided on the walls of each network of alveolar walls. The notches of the walls of a network of alveolar walls are arranged to be inserted, in a complementary manner, into the notches of the walls of the other network of alveolar walls, allowing the nesting of the first network of alveolar walls of the front structure into the second network of alveolar walls of the rear structure.

According to another form, the networks of alveolar walls each comprise walls of a frusto-conical section overlapping relative to each other to allow the nesting of the first network of alveolar walls of the front structure into the second network of alveolar walls of the rear structure.

After assembly, the rear structure can have alveolar patterns offset by a half-period relative to the alveolar patterns of the front structure.

The present disclosure also concerns a thrust reverser flap for an aircraft turbojet engine nacelle formed of an acoustic attenuation panel as previously defined.

The present disclosure also concerns a method for manufacturing an acoustic attenuation panel for an aircraft turbojet engine nacelle as previously defined.

The method comprises the following steps:
obtaining a front structure including an acoustic front skin and a first network of alveolar walls,
obtaining a rear structure including a rear skin and a second network of alveolar walls,
assembling the front structure to the rear structure to form the acoustic attenuation panel, the first and second networks of alveolar walls cooperating together so as to form an alveolar central core which is positioned between the acoustic front skin and the rear skin, the front structure and the rear structure being positioned opposite to each other and so that the network of alveolar walls of a structure is spaced from the skin of the other structure facing it by a clearance d.

The front and rear structures each comprise a peripheral border, said borders being fastened to each other for the assembly of the front and rear structures.

In one form, during the assembly step, the first network of alveolar walls of the front structure is nested into the second network of alveolar walls of the rear structure.

During the assembly step, the first network of alveolar walls of the front structure is nested into the second network of alveolar walls of the rear structure by means of notches provided on walls forming each network of alveolar walls. The notches of the walls of each network of alveolar walls are arranged to be inserted into each other.

Advantageously, during the assembly step, the structures are fastened to each other only at respective peripheral borders provided on each of the two structures.

The present disclosure thus provides an acoustic attenuation panel for an aircraft turbojet engine nacelle which is simpler to implement and repair, more rigid and in which the useful acoustic surface is improved.

The assembly of the structures is carried out in a single step.

The method of the present disclosure allows reducing the manufacturing time and a substantial reduction in manufacturing costs.

Indeed, each of the first and second structures forms a "half-shell" which, when assembled together, allows obtaining an acoustic attenuation panel. It is therefore easy to manufacture these two structures independently then, assembling them, in an easy manner, relative to the prior art.

The nesting with the notches allows improving the stiffness of the panel. The proposed solution allows better absorbing the mechanical stresses.

It is also possible to obtain up to 80% of acoustic surface.

Due to the fact that these structures are opposite to each other and spaced from each other, there is a clearance between these two structures over the entire extent of the acoustic core, except possibly at singularities linked to the fastening of fittings by example.

This clearance, less than 2 mm, is provided between the two structures so as to provide the correct mounting of the part and to avoid the vibrations and/or deformations during its use. This clearance should however be limited so as not to degrade its acoustic performance as a resonator.

The maintenance is also facilitated. In the case of damage to the acoustic skin caused by impacts, it is possible to very easily change the damaged portion by removing the fasteners and remounting a new half-shell.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
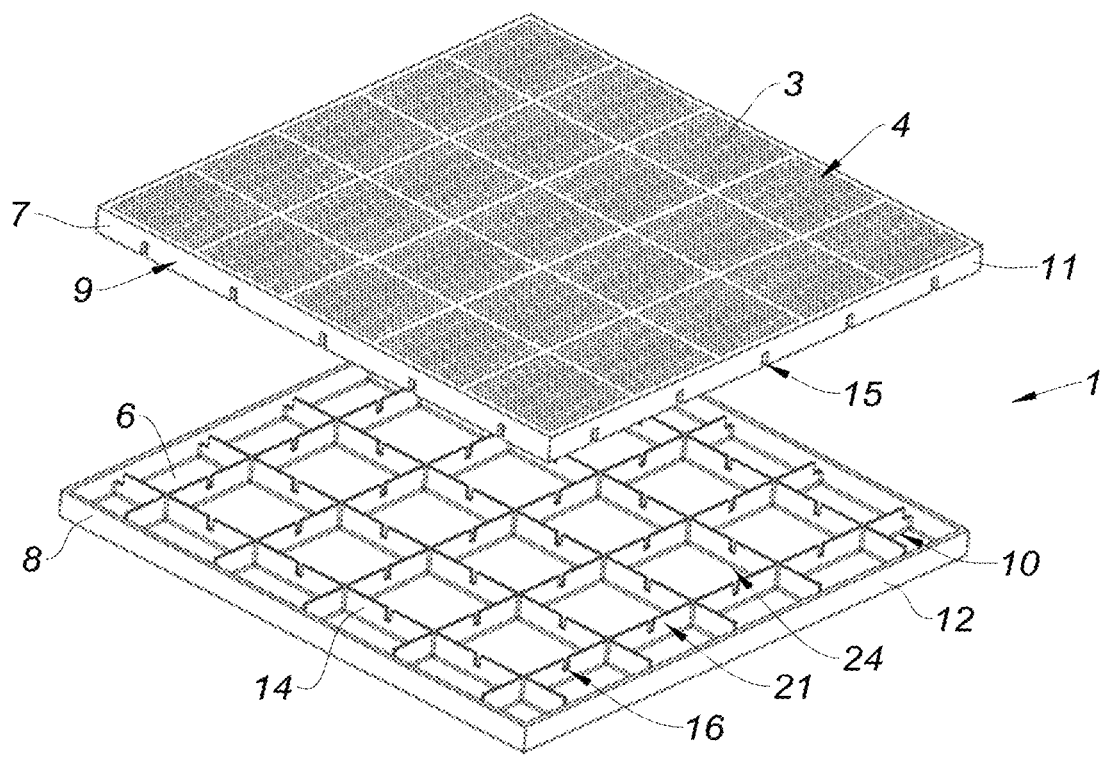
FIG. 1 is an exploded perspective view of an acoustic attenuation panel according to one form of the present disclosure.
Figure 2:
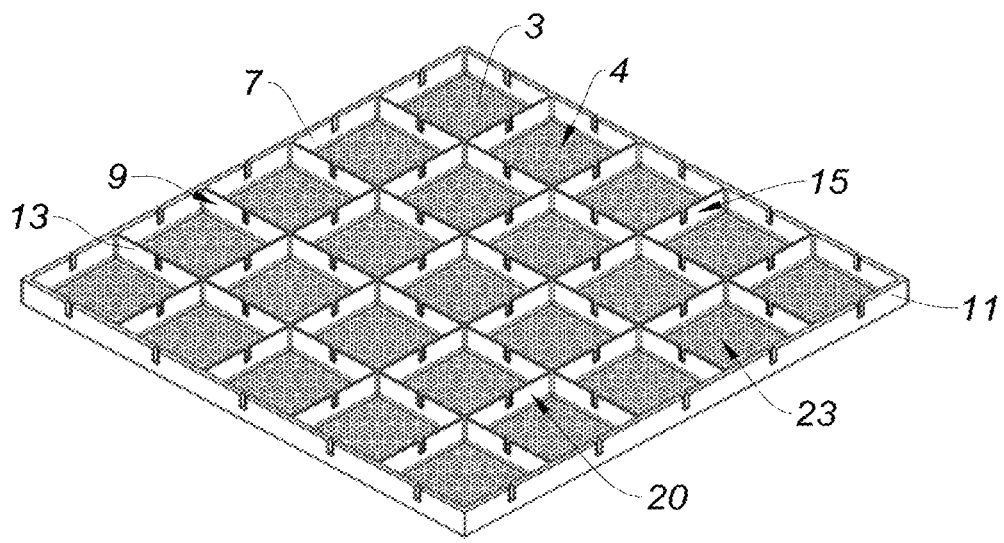
FIG. 2 is a perspective view of a front structure of the acoustic attenuation panel according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 3:
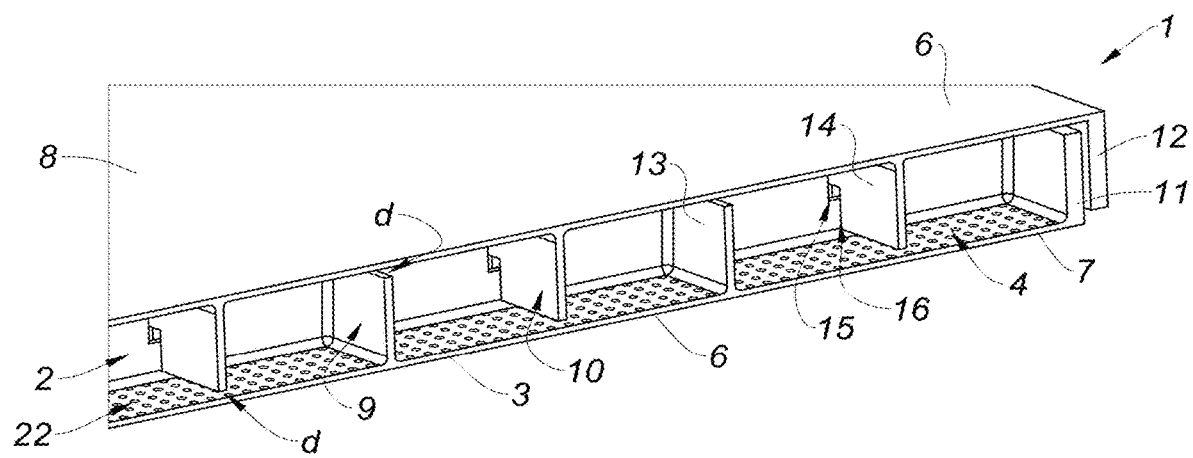
FIG. 3 is a perspective sectional view of the acoustic attenuation panel according to one form of the present disclosure.

Referring to FIGS. 1 and 3, an acoustic attenuation panel 1 for an aircraft turbojet engine nacelle is shown. This acoustic attenuation panel 1 includes an alveolar central core 2 interposed between an acoustic front skin 3 comprising perforations 4 and a rear skin 6.

The terms "front" and "rea" have been defined by way of illustration and are not limiting.

The acoustic attenuation panel 1 includes a front structure 7 and a rear structure 8.

According to the present disclosure, the front structure 7 includes the acoustic front skin 3 and a first network of alveolar walls 9 secured thereto.

The rear structure 8 includes the rear skin 6 and a second network of alveolar walls 10 secured thereto.

The first 9 and second 10 networks of cellular walls are complementary and cooperate together so as to form, in the assembled position, the alveolar central core 2.

The front structure 7 and the rear structure 8 are positioned opposite to each other and so that the network of alveolar walls 9, 10 of a structure 7, 8 is spaced from the skin 3, 6 of the other structure 7, 8 facing it by a gap d, as illustrated in FIG. 3.

In other words, the first network of alveolar walls 9 of the front structure 7 is spaced from the rear skin 6 of the rear structure 8 by a gap d.

Likewise, the second network of alveolar walls 10 of the rear structure 8 is spaced from the acoustic front skin 3 of the front structure 7 by a gap d. This gap d can be identical to or different from the gap d separating the first network of alveolar walls 9 of the front structure 7 from the rear skin 6 of the rear structure 8.

The gap d or clearance is advantageously less than 2 mm and in one form less than 1.5 mm, while being greater than zero. This clearance allows the drainage of fluids.

The two structures 7, 8 comprise respective peripheral borders 11, 12 which are fastened to each other by gluing or welding or mechanical assembly, for example.

Each network of alveolar walls 9, 10 of a structure 7, 8 is formed of walls 13, 14 protruding on a respective inner surface 44, 47 of one of the skins 3, 6 of this structure 7, 8.

Notches 15, 16 are provided on the walls 13, 14 of each network of alveolar walls 9, 10.

The notches 15, 16 of the walls 13, 14 of a network of alveolar walls 9, 10 are arranged to be inserted, in a complementary manner, into the notches 15, 16 of the walls 13, 14 of the other network of alveolar walls 9, 10, allowing the nesting of the first network of alveolar walls 9 of the front structure 7 into the second network of alveolar walls 10 of the rear structure 8.

The opposite and complementary notches 15, 16 are therefore inserted into each other.

The notches 15, 16 are oblong in shape and extend along the walls 13, 14 from an inner rim 20, 21 of the walls 13, 14 and towards the skin 3, 6.

More specifically, it is these inner rims 20, 21 of the walls 13, 14 which are distant from the skins 3, 6 which face them.

The height of the notches may vary and be lower at structural zones to maintain this gap d.

The peripheral border 11 of the front structure 7 comprises notches 15.

The peripheral border 12 of the rear structure 8 does not include notches.

After nesting, the peripheral border 12 of the rear structure 8 surrounds the peripheral border 11 of the front structure 7 and vice versa.

The first network of alveolar walls 9 and the second network of alveolar walls 10 have alveoli 23, 24 of a square shape to form an alveolar central core 2 with parallelepiped alveoli 22 of square sections. Other shapes are possible like rectangular, hexagonal, circular or any shapes.

The alveoli 23, 24 or acoustic cells have dimensions of 100 mm×100 mm or in another form 50 mm×50 mm.

The geometry of the alveoli or acoustic cells should be inscribed in a square of 49 mm×49 mm in order to have the same efficiency as for the known solution called NIDA for an application on a thrust reverser.

Other dimensions are also possible.

Other applications are also possible in the field of aeronautics or otherwise.

FIG. 1 represents a rear structure 8 having alveolar patterns offset by a half-period, or half-pitch, relative to the alveolar patterns of the front structure 7 in two non-parallel directions in order to allow a perfect nesting.

In other words, the alveoli 24 of the rear structure 8 which are adjacent to the peripheral border 12 have one side having a width reduced by half.

The front structure 7 comprises entire alveoli 23 along the peripheral border 11.

Figure 9:
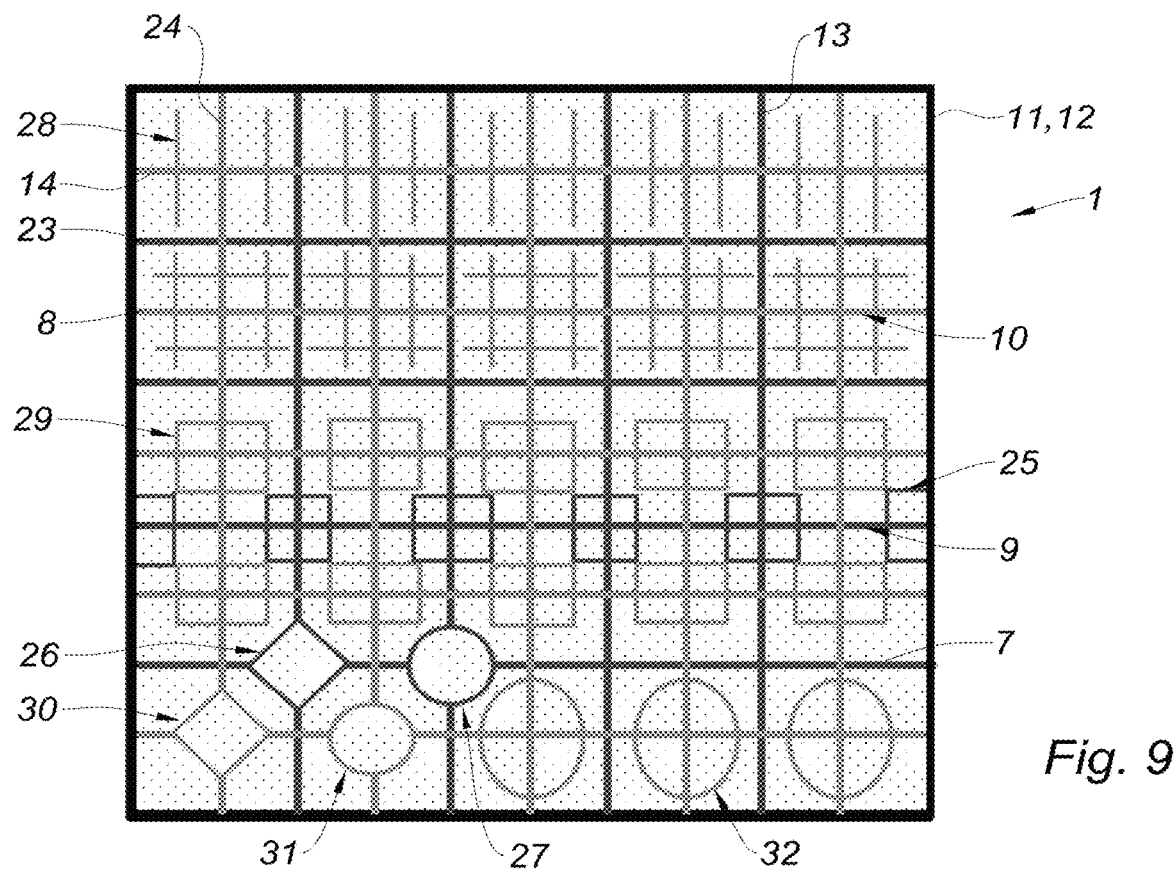
FIG. 9 is a schematic view of a first and a second network of alveolar walls according to another form of the present disclosure.

FIG. 9 represents first and second networks of alveolar walls 9, 10 according to another form of the present disclosure.

The first network of alveolar walls 9 comprises alveoli 23 of a square section as previously described above and additional alveoli 25 which are inserted in the alveoli 23. The additional alveoli 25 are of a rectangular or square section and are positioned about the intersections formed by two walls 13. They allow reducing the size of the cells to stiffen the front structure 7.

The first network of alveolar walls 9 comprises additional alveoli in the shape of a diamond 26 or a ring 27 at the intersections formed by two walls 13.

The second network of alveolar walls 10 comprises alveoli 24 of rectangular or square section as previously described above and additional walls 28 inserted into the alveoli 24.

The additional walls 28 are perpendicular to the walls 14 of the second network of alveolar walls 10.

The second network of alveolar walls 10 comprises additional alveoli of a square section 29, in the shape of a diamond 30, of a circular section 31 and ovoid section 32 centered at the intersections of the walls 14.

Figure 10:
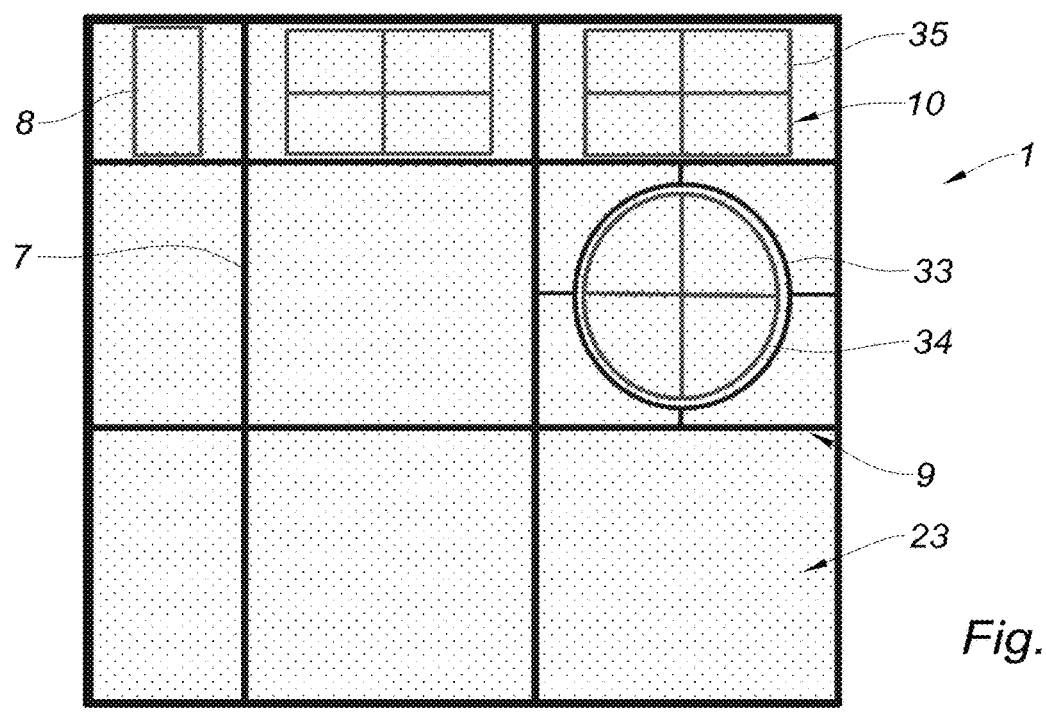
FIG. 10 is a schematic view of a first and a second network of alveolar walls according to another form of the present disclosure.

FIG. 10 represents a first and a second network of alveolar walls 9, 10 according to another form of the present disclosure.

The first network of alveolar walls 9 comprises alveoli 23 of a square section as previously described and an additional alveoli of elliptical section 33 located in an alveoli 23.

The second network of alveolar walls 10 comprises alveoli of a rectangular section 35 arranged to be inserted into an alveoli 23 of the first network of alveolar walls 9 and an alveoli of elliptical section 34 arranged to be inserted into an additional alveoli of elliptical section 33 of the first network of alveolar walls 9 during the assembly of the structures 7, 8.

Regardless of the shape of the additional cell and the design configuration, it is spaced from the skin 3, 6 of a structure 7, 8 facing it by the gap d which is previously defined.

The addition of "any" additional closed profiles or alveoli allows keeping the cell volume equivalent to 50 mm×50 mm.

Alternatively, the two structures 7, 8 can be nested without notches.

Figure 11:
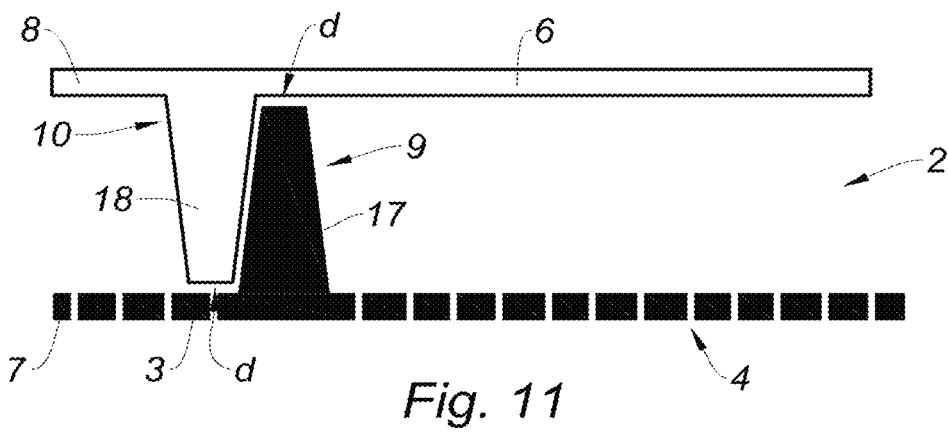
FIG. 11 is a side sectional view of two networks of alveolar walls being nested without notches according to another form of the present disclosure.

FIG. 11 represents two networks of alveolar walls 9, 10 being nested without notches according to one form of the present disclosure.

The networks of alveolar walls 9, 10 each comprise walls of a frusto-conical section 17, 18 overlapping relative to each other to allow the nesting of the first network of alveolar walls 9 of the front structure 7 into the second network of alveolar walls 10 of the rear structure 8.

The walls of a frusto-conical section 17, 18 protrude on the inner surface of the skin 3, 6 of the structure 7, 8 which is associated thereto.

The walls of a frusto-conical section 17, 18 slide over each other during the nesting of the structures 7, 8. This sliding causes a blocking of the structures 7, 8 relative to each other.

A gap d is now between the walls of a frusto-conical section 17, 18 and the skin 3, 6 facing it.

Figure 12:
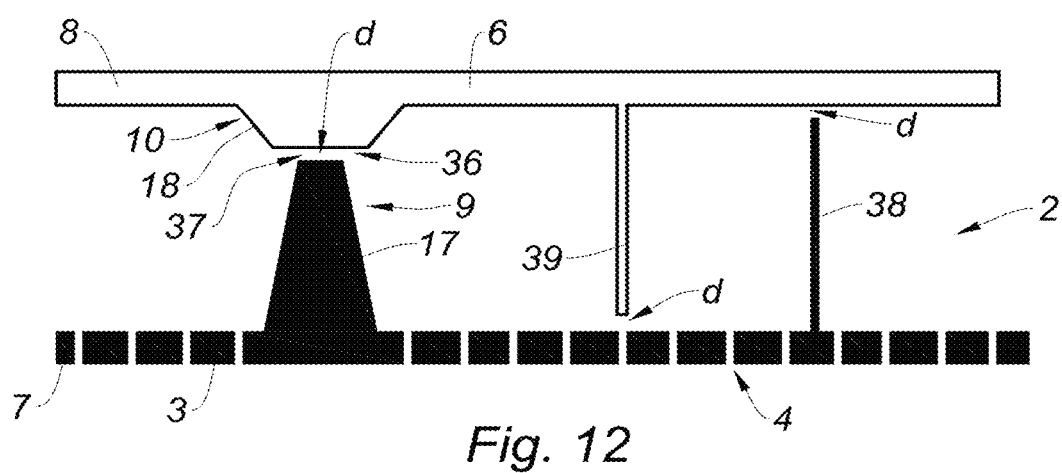
FIG. 12 is a side sectional view of two networks of alveolar walls being nested without notches according to another form of the present disclosure.

FIG. 12 represents two network of alveolar walls 9, 10 being nested without notches according to another form of the present disclosure.

The front structure 7 comprises an acoustic front skin 3 comprising perforations 4 and walls of a front frusto-conical section 17 protruding perpendicularly from the acoustic front skin 3.

The rear structure 8 includes a rear skin 6 and walls of a rear frusto-conical section 18 protruding from the rear skin 6.

The walls of a frusto-conical section 17, 18 are positioned opposite to each other after assembly so that a gap d is formed between the respective upper faces 36, 37 of the walls of a frusto-conical section 17, 18.

The walls of a front frusto-conical section 17 have a greater height than the walls of a rear frusto-conical section 18 and vice versa.

The front structure 7 possibly comprises additional front walls 38 perpendicular to the acoustic front skin 3.

The rear structure 8 possibly comprises additional rear walls 39 perpendicular to the rear skin 6.

The free end of the additional front and rear walls 38, 39 is spaced from the skin 3, 6 of the structure 7, 8 facing it by a gap d.

Figure 13:
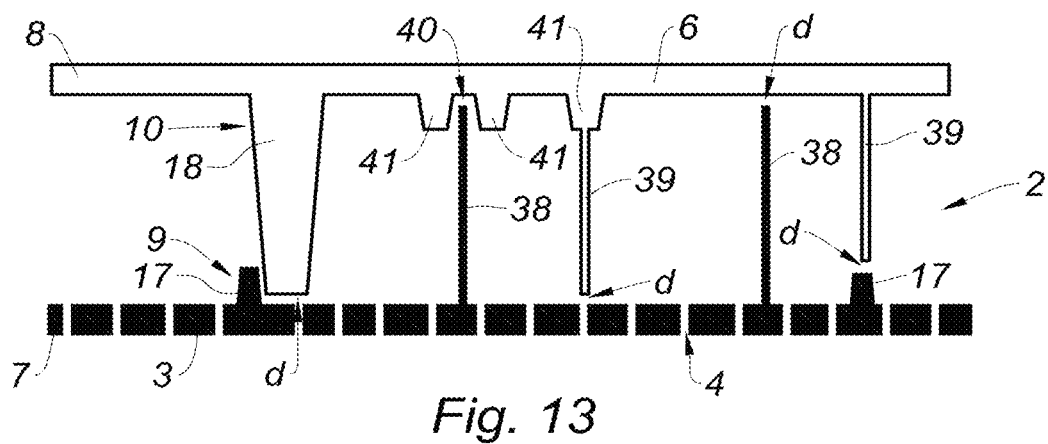
FIG. 13 is a side sectional view the two networks of alveolar walls being nested without notches according to another form of the present disclosure.

Other variations are also possible as represented in FIG. 13.

The front structure 7 comprises an acoustic front skin 3 comprising perforations 4 and walls of a front frusto-conical section 17 protruding from the acoustic front skin 3.

The rear structure 8 includes a rear skin 6 and walls of a rear frusto-conical section 18 protruding from the rear skin 6.

The walls of a frusto-conical section 17, 18 slide over each other during the nesting of the structures 7, 8.

The walls of a front frusto-conical section 17 having a stiffener function have a height which is lower than the walls of a rear frusto-conical section 18 and vice versa.

The front structure 7 comprises additional front walls 38 protruding from the acoustic front skin 3.

The rear structure 8 comprises additional rear walls 39 protruding from the rear skin 6.

The rear structure 8 comprises walls of a rear frusto-conical section of a smaller dimension which is positioned side by side to form a baffle 40.

An additional front wall 38 of the front structure 7 is positioned opposite to the baffle 40.

Walls of a front frusto-conical section 17 having a stiffener function can be positioned opposite to an additional rear wall 39. A clearance or gap d is provided between these elements.

Figure 8:
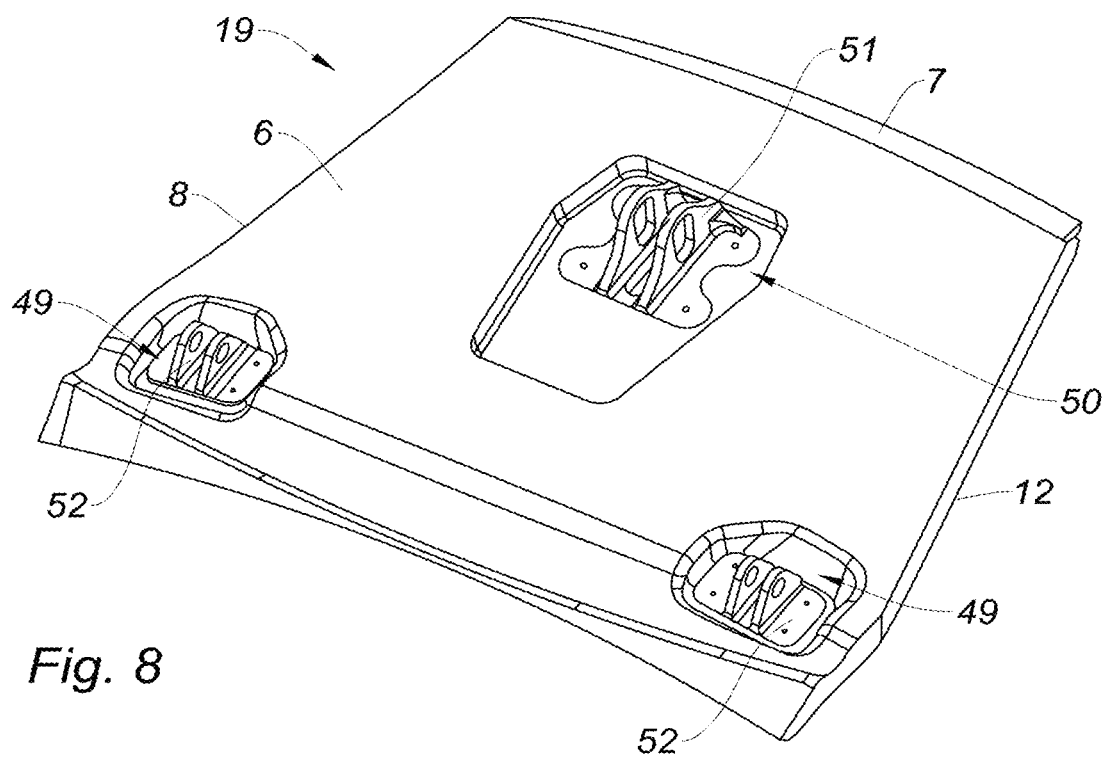
FIG. 8 is a perspective rear view of a flap with fittings according to one form of the present disclosure.

The present disclosure also concerns a thrust reverser flap or cowl 19 for an aircraft turbojet engine nacelle formed of an acoustic attenuation panel 1 as previously described and illustrated in FIG. 8.

The thrust reverser flap 19 comprises an alveolar central core 2 interposed between an acoustic front skin 3 comprising perforations 4 and a rear skin 6.

Figure 4:
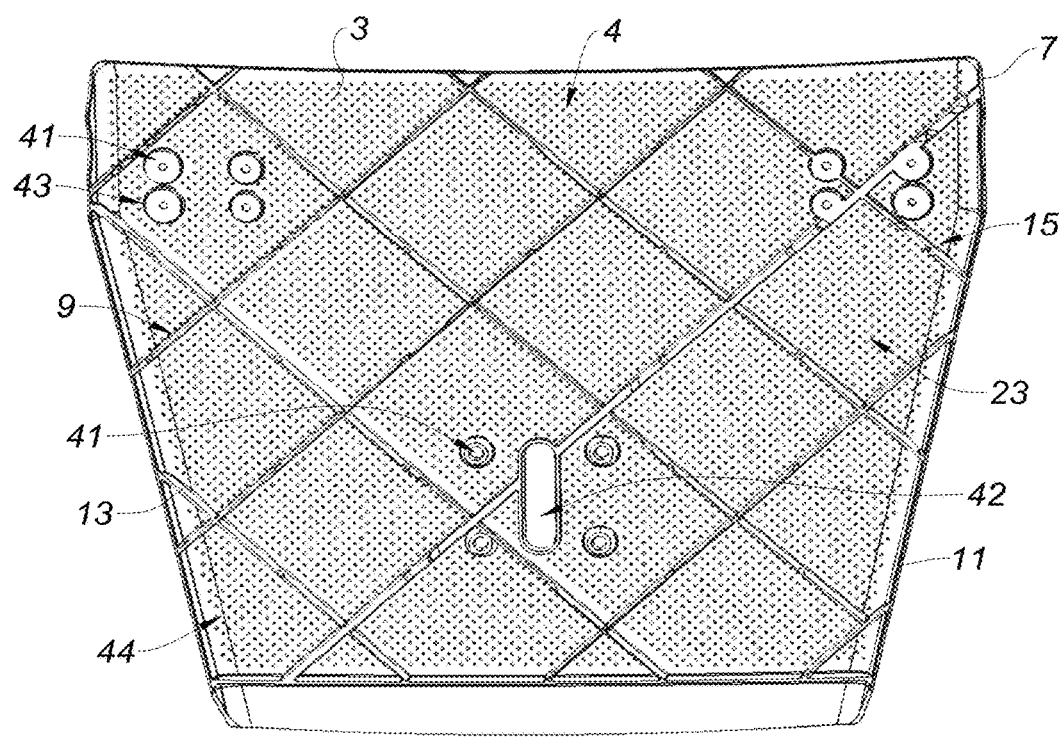
FIG. 4 is a plan view of the inside of a front structure of a thrust reverser flap formed from an acoustic attenuation panel according to one form of the present disclosure.
Figure 5:
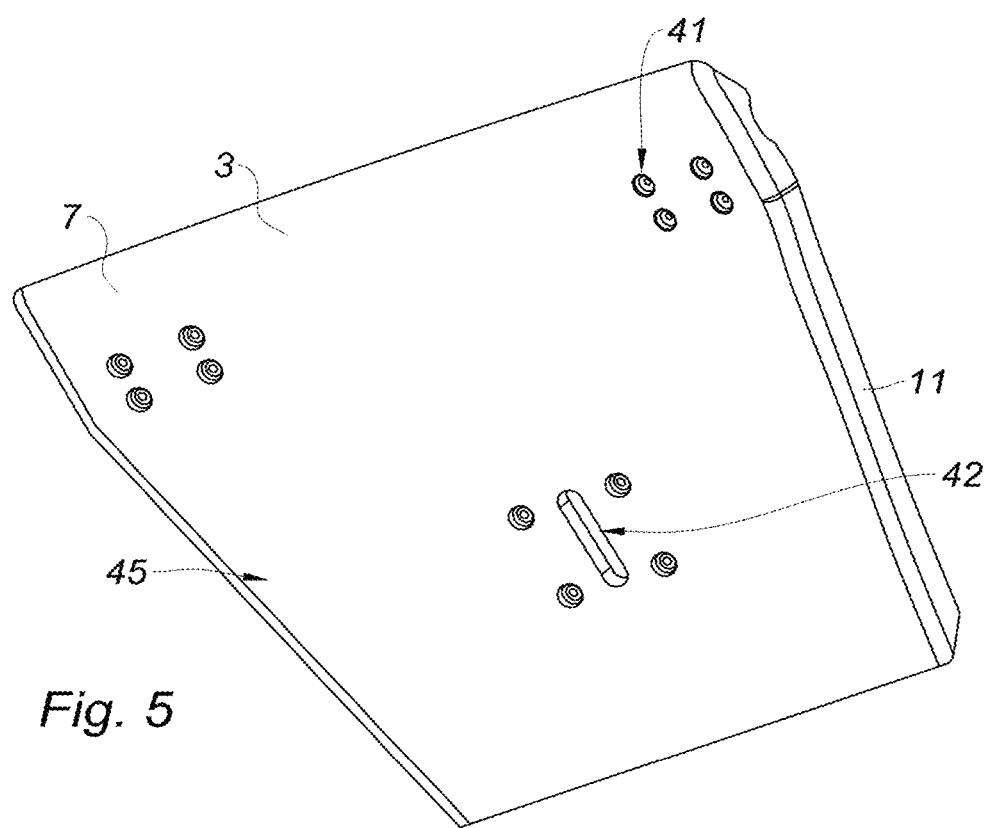
FIG. 5 is a perspective view of the outside of the front structure of FIG. 4.
Figure 6:
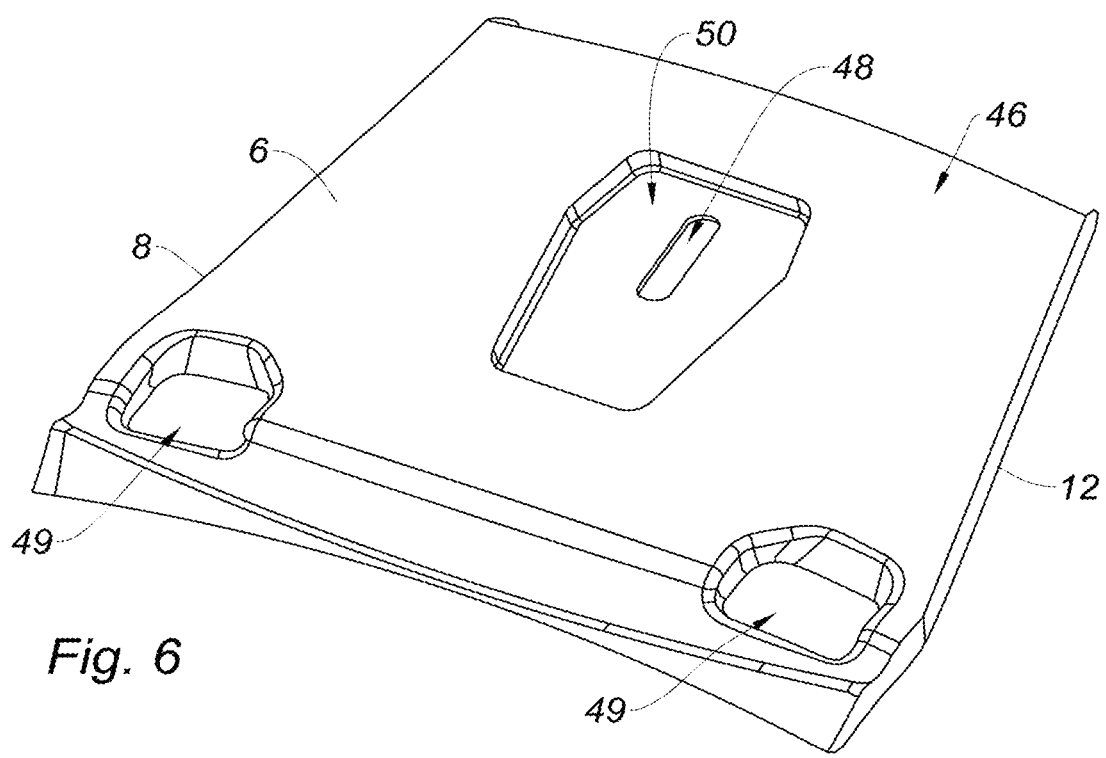
FIG. 6 is a perspective view of the outside of a rear structure of a thrust reverser flap formed from an acoustic attenuation panel according to one form of the present disclosure.
Figure 7:
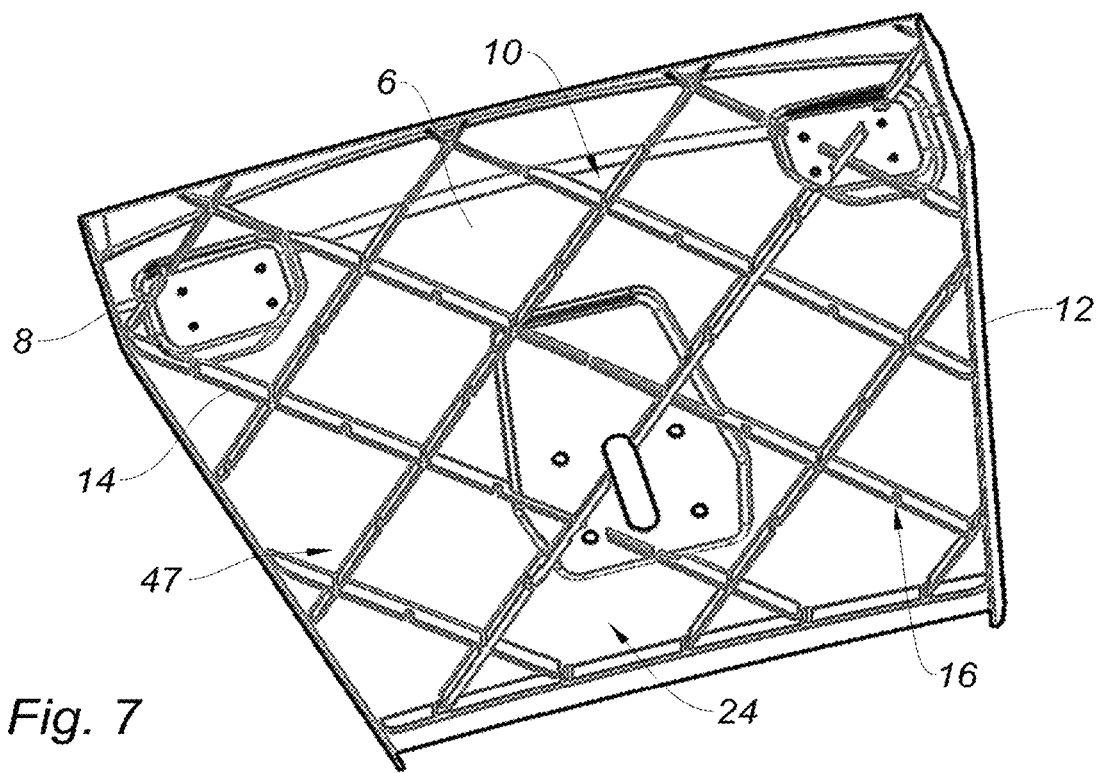
FIG. 7 is a perspective view of the inside of the rear structure of FIG. 6.

The acoustic attenuation panel 1 includes a front structure 7 called the front half-cowl in FIGS. 4 and 5 and a rear structure 8 called rear half-cowl in FIGS. 6 and 7.

The front structure 7 includes the acoustic front skin 3 and a first network of alveolar walls 9 fastened thereto.

The rear structure 8 includes the rear skin 6 and a second network of alveolar walls 10 fastened thereto.

The first 9 and second 10 networks of alveolar walls are complementary so as to form, in the assembled position, the alveolar central core 2.

The front structure 7 and the rear structure 8 are positioned opposite to each other and so that the network of alveolar walls 9, 10 of a structure 7, 8 is spaced from the skin 3, 6 of the other structure 7, 8 facing it by a non-zero gap d. This gap d is less than 5 mm, for example. It is advantageously less than 2 mm and in one form less than 1.5 mm.

The front structure 7 and the rear structure 8 are fastened by gluing, welding or clipping.

The structures 7, 8 can be made of thermoplastic, thermosetting, thermoplastic/metal hybrid or of ceramic composite or other materials depending on the mechanical and environmental criteria of the part.

During the manufacturing step, detailed later, orifices 41 surrounded by a flange 43 are provided to fasten fittings. An oblong orifice 42 is provided for the passage of a connecting rod.

The front structure 7 comprises an inner face 44 on which the first network of alveolar walls 9 protrudes.

The acoustic front skin 3 of the front structure 7 comprises an outer face 45, as illustrated in FIG. 5.

FIG. 6 illustrates the rear structure 8 comprising an outer face 46.

The rear structure 8 comprises an oblong orifice 48 for the passage of a connecting rod.

Yokes or cavities 49, 50 are formed during the molding of the rear structure 8 to receive fittings. The yokes 49, 50 are integrated into the rear skin 6.

The rear skin 6 of the rear structure 8 comprises an inner face 47, as illustrated in FIG. 7.

The second network of alveolar walls 10 protrudes perpendicularly from the inner face 47 of the rear structure 8.

FIG. 8 represents a rear view of a thrust reverser flap 19 with fittings 51, 52 including a connecting rod fitting 51 and two hinge fittings 52.

The fittings can be which are directly mounted and fastened to the rear skin 6 of the rear structure 8 by gluing, welding or clipping.

The fittings may alternatively be fittings which are co-injected during the manufacturing step of the rear structure 8.

The present disclosure also concerns a method for manufacturing an acoustic attenuation panel 1 for an aircraft turbojet engine nacelle as previously defined.

The method comprises a step of obtaining a front structure 7 including an acoustic front skin 3 and a first network of alveolar walls 9, and a step of obtaining a rear structure 8 including a rear skin 6 and a second network of alveolar walls 10.

Regardless of the structure 7, 8, the network of alveolar walls 9, 10 and the skin 3, 6 are manufactured together by molding a thermoplastic polymer allowing obtaining an injected or molded composite in a single step.

The perforations 4 are made on the acoustic front skin 3 during molding or afterwards.

The yokes 49, 50 are formed during the molding of the rear structure 8.

The fittings 51, 52 are then fastened to the rear structure 8.

The method includes a step of assembling the front structure 7 to the rear structure 8 in order to form the acoustic attenuation panel 1.

The first 9 and second 10 networks of alveolar walls cooperate together so as to form an alveolar central core 2 which is positioned between the acoustic front skin 3 and the rear skin 6.

The front structure 7 and the rear structure 8 are positioned opposite to each other and so that the network of alveolar walls 9, 10 of a structure 7, 8 is spaced from the skin 3, 6 of the other structure 7, 8 facing it or opposed thereto by a gap d which is non-zero but less than 2 mm.

In general, during the assembly step, the first network of alveolar walls 9 of the front structure 7 is nested into the second network of alveolar walls 10 of the rear structure 8. Different nesting means are possible.

In one form, during the assembly step, the first network of alveolar walls 9 of the front structure 7 is nested (or entangled) into the second network of alveolar walls 10 of the rear structure 8 by means of previously described notches 15, 16 which are provided on walls 13, 14 forming each network of alveolar walls 9, 10.

The notches 15, 16 of the walls 13, 14 of each network of alveolar walls 9, 10 are arranged to be inserted into each other.

During the assembly step, the structures 7, 8 are fastened to each other at respective peripheral borders 11, 12 provided on each of the two structures 7, 8.

The fastening can be mechanical with fastening means. Alternatively, the fastening can be carried out by gluing or welding on the peripheral borders 11, 12 of the parts.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An acoustic attenuation panel for an aircraft turbojet engine nacelle, the acoustic attenuation panel including an alveolar central core interposed between an acoustic front skin comprising perforations and a rear skin, the acoustic attenuation panel including a front structure and a rear structure,
   wherein:
      the front structure includes the acoustic front skin and a first network of alveolar walls, the rear structure including the rear skin and a second network of alveolar walls, the front and rear structures each comprising a peripheral border, said border of the front and rear structures being fastened to each other for assembly of the front and rear structures, the first and second networks of alveolar walls being complementary so as to form, in an assembled position, the alveolar central core, the front structure and the rear structure being positioned opposite to each other and so that the first and second networks of alveolar walls are spaced from the front and rear skins by a clearance d.

2. The acoustic attenuation panel according to claim 1, wherein the clearance d is less than 2 mm.

3. The acoustic attenuation panel according to claim 2, wherein the clearance d is than 1.5 mm.

4. The acoustic attenuation panel according to claim 1, wherein each of the first and second networks of alveolar walls is formed of walls protruding on a respective inner surface of the front and rear skin, notches being provided on the alveolar walls, the notches being arranged to be inserted, in a complementary manner, into the notches of other alveolar walls, allowing the nesting of the first network of alveolar walls of the front structure into the second network of alveolar walls of the rear structure.

5. The acoustic attenuation panel according to claim 1, wherein the networks of alveolar walls each comprise walls of a frusto-conical section overlapping relative to each other to allow the nesting of the first network of alveolar walls of the front structure into the second network of alveolar walls of the rear structure.

6. The acoustic attenuation panel according to claim 1, whereinafter assembly, the rear structure has alveolar patterns offset by a half-period relative to alveolar patterns of the front structure.

7. A thrust reverser flap for an aircraft turbojet engine nacelle wherein the thrust reverser flap is formed of an acoustic attenuation panel according to claim 1.

8. A method for manufacturing an acoustic attenuation panel for an aircraft turbojet engine nacelle according to claim 1, wherein the method comprises:
- obtaining the front structure including the acoustic front skin and the first network of alveolar walls;
- obtaining the rear structure including the rear skin and the second network of alveolar walls; and
- assembling the front structure to the rear structure to form the acoustic attenuation panel, the front and rear structures each comprising the peripheral border, said borders being fastened to each other for assembly of the front and rear structures, the first and second networks of alveolar walls cooperating together so as to form an alveolar central core positioned between the acoustic front skin and the rear skin, the front structure and the rear structure being positioned opposite to each other and so that the network of alveolar walls is spaced by the clearance d.

9. The manufacturing method according to claim 8, wherein during the assembling, the first network of alveolar walls of the front structure is nested into the second network of alveolar walls of the rear structure.

10. The manufacturing method according to claim 9, wherein during the assembling, the first network of alveolar walls of the front structure is nested into the second network of alveolar walls of the rear structure by notches.

11. The manufacturing method according to claim 8, wherein, during the assembling, the front and rear structures are fastened to each other only at peripheral borders respectively provided on each of the front and rear structures.

* * * * *